(12) United States Patent
Miura et al.

(10) Patent No.: US 9,797,781 B2
(45) Date of Patent: Oct. 24, 2017

(54) THERMISTOR DEVICE

(71) Applicant: Murata Manufacturing Co., Ltd., Nagaokakyo-shi, Kyoto-fu (JP)

(72) Inventors: Tadamasa Miura, Nagaokakyo (JP); Shuichi Kawata, Nagaokakyo (JP); Yuki Yamamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 383 days.

(21) Appl. No.: 14/683,211

(22) Filed: Apr. 10, 2015

(65) Prior Publication Data

US 2015/0211940 A1    Jul. 30, 2015

Related U.S. Application Data

(63) Continuation of application No. PCT/JP2013/072705, filed on Aug. 26, 2013.

(30) Foreign Application Priority Data

Nov. 28, 2012  (JP) ................................ 2012-259841

(51) Int. Cl.
*H01C 7/10* (2006.01)
*G01K 7/22* (2006.01)
(Continued)

(52) U.S. Cl.
CPC ............... *G01K 7/22* (2013.01); *H01C 1/012* (2013.01); *H01C 1/14* (2013.01); *H01C 1/1406* (2013.01);
(Continued)

(58) Field of Classification Search
CPC ........ H01C 1/012; H01C 1/14; H01C 1/1406; H01C 7/008; H01C 7/02; H01C 7/04
(Continued)

(56) References Cited

U.S. PATENT DOCUMENTS 5,561,411 A    10/1996    Kuzuoka
8,598,975 B2 *  12/2013    Miura ...................... G01K 7/22
                                                    338/13
(Continued)

FOREIGN PATENT DOCUMENTS

CN    102483978 A    5/2012
JP    01-270302 A    10/1989
(Continued)

OTHER PUBLICATIONS

Official Communication issued in International Patent Application No. PCT/JP2013/072705, dated Nov. 19, 2013.

*Primary Examiner* — Kyung Lee
(74) *Attorney, Agent, or Firm* — Keating & Bennett, LLP

(57) ABSTRACT

In order to further improve stress tolerance, a thermistor device includes a first base material member made of resin, a thermistor element including a thermistor thin film provided on a metal base material and first and second external electrodes provided on the thermistor thin film, and a first lead electrode and a second lead electrode provided on a principal surface of the first base material member, and connected to the first external electrode and the second external electrode. Each of the metal base material and the thermistor thin film undergoes a deflection between the first external electrode and the second external electrode.

20 Claims, 6 Drawing Sheets

(51) Int. Cl.
*H01C 7/02* (2006.01)
*H01C 7/04* (2006.01)
*H01C 1/14* (2006.01)
*H01C 1/012* (2006.01)
*H01C 7/00* (2006.01)
*H01M 2/34* (2006.01)
*H01M 10/48* (2006.01)
*H01M 10/0525* (2010.01)

(52) U.S. Cl.
CPC ........... *H01C 1/1413* (2013.01); *H01C 7/008* (2013.01); *H01C 7/02* (2013.01); *H01C 7/04* (2013.01); *H01M 2/348* (2013.01); *H01M 10/486* (2013.01); *H01M 10/0525* (2013.01); *H01M 2200/10* (2013.01)

(58) Field of Classification Search
USPC ....................................................... 338/22 R
See application file for complete search history.

(56) References Cited

U.S. PATENT DOCUMENTS

| | | |
|---|---|---|
| 2012/0188051 A1 | 7/2012 | Miura |
| 2013/0221584 A1 | 8/2013 | Miura |
| 2013/0288091 A1 | 10/2013 | Tsubaki et al. |
| 2013/0328154 A1* | 12/2013 | Miura .................... H01C 7/008 257/467 |

FOREIGN PATENT DOCUMENTS

| | | |
|---|---|---|
| JP | 06-040829 U | 5/1994 |
| JP | 07-29706 A | 1/1995 |
| JP | 08-068699 A | 3/1996 |
| JP | 2000-266608 A | 9/2000 |
| WO | 2011/024724 A1 | 3/2011 |
| WO | 2012/093572 A1 | 7/2012 |

* cited by examiner

THERMISTOR DEVICE

BACKGROUND OF THE INVENTION

1. Field of the Invention

The present invention relates to a thermistor device including a flexible thermistor element.

2. Description of the Related Art

Conventionally, this kind of thermistor device is used for a temperature sensor or the like. This temperature sensor includes, as described in, for example, Japanese Patent Application Laid-Open No. 2000-266608, a heat-resistant resin sheet, two lead electrodes, a ceramic thermistor element, and an exterior sheet. The heat-resistant resin sheet is composed of polyimide of approximately 50 µm in thickness. The two lead electrodes are composed of a metallic material containing silver of approximately 10 µm in thickness. The two lead electrodes are formed by printing or the like on a principal surface of the heat-resistant resin sheet, so as to be spaced at a predetermined interval. The thermistor element is approximately 0.5 mm in thickness, and connected to one end of the two lead electrodes. The exterior sheet is composed of polyimide of approximately 50 µm in thickness. This exterior sheet covers the respective lead electrodes and the thermistor element. However, the other end of each lead electrode is exposed for connection to another circuit. The heat-resistant resin sheet and exterior sheet are closely attached and fixed with a heat-resistant adhesive.

In the use of the temperature sensor described above, the user fixes the thermistor element with an adhesive or the like onto an object to be detected such as, for example, a lithium ion battery. Then, in the temperature sensor, a voltage value that is correlated to the temperature of the object to be detected is output to the other end of the two lead electrodes.

However, the heat-resistant resin sheet and exterior sheet made of polyimide expand with the changes in the temperature of the object to be detected. In general, the resin (heat-resistant resin sheet and exterior sheet) expands more than the thermistor element. This expansion places stress on the connection parts between the thermistor element and each lead electrode. There has been a problem that this stress fractures the connection parts, or cracks the body of the thermistor element.

SUMMARY OF THE INVENTION

Therefore, preferred embodiments of the present invention provide a thermistor device with further improved tolerance to stress.

According to a first aspect of various preferred embodiments of the present invention, a thermistor device includes a first base material member made of resin, which includes a principal surface; a thermistor element including a thermistor thin film provided on a metal base material and a first external electrode and a second external electrode provided on the thermistor thin film; and a first lead electrode and a second lead electrode provided on the principal surface of the first base material member, and connected to the first external electrode and the second external electrode, where each of the thermistor thin film and the metal base material undergoes a deflection between the first external electrode and the second external electrode.

The aspect mentioned above makes it possible to provide a thermistor with stress tolerance that is further improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Thermistor devices according to preferred embodiments of the present invention will be described below in great detail with reference to the drawings.

First, the x axis, y axis, and z axis will be described which are shown in some of the drawings. The x axis, y axis, and z axis, which are perpendicular to each other, indicate the horizontal direction, front-back direction, and thickness direction of the thermistor device.

Figure 1:
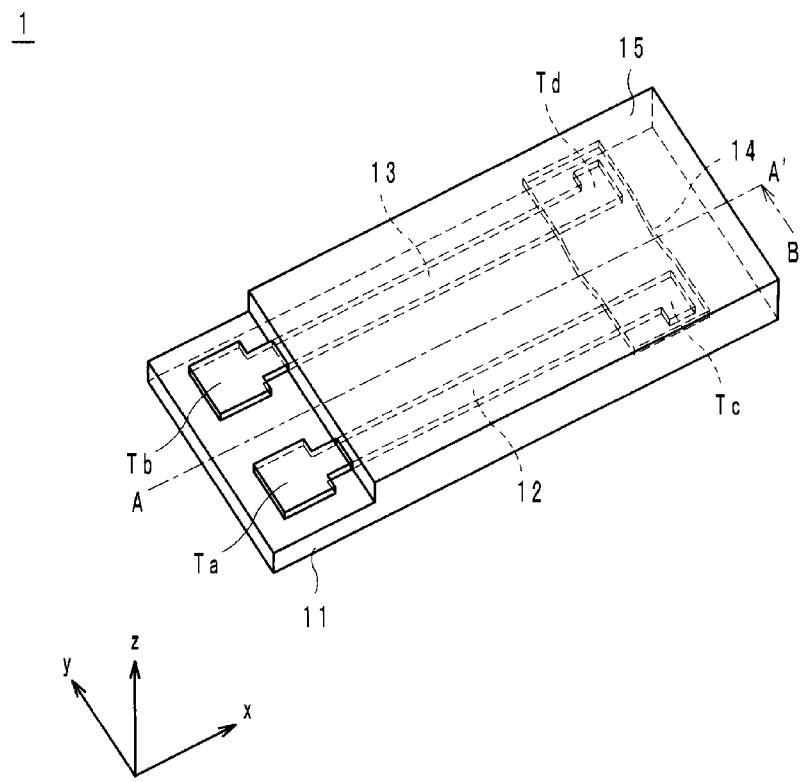
FIG. 1 is a perspective view of the appearance of a thermistor device according to a preferred embodiment of the present invention.
Figure 2:
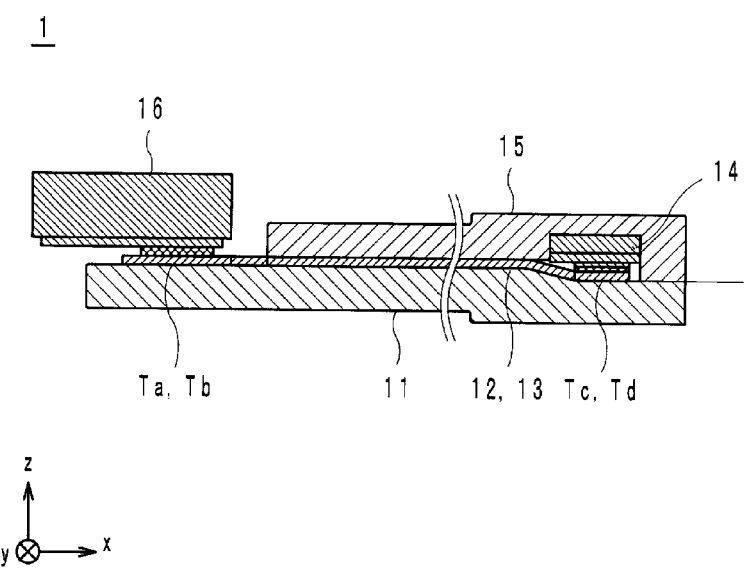
FIG. 2 is a vertical cross-sectional view of the thermistor device as a view of a cross section along the line A-A' of FIG. 1 from the direction of an arrow B.
Figure 3:
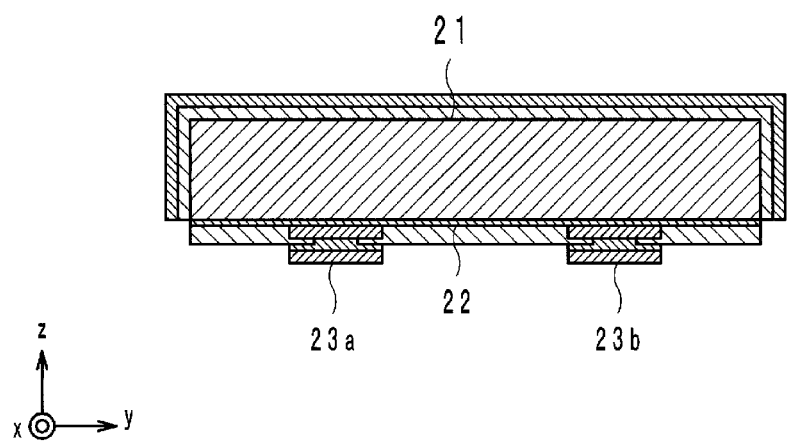
FIG. 3 is a vertical cross-sectional view illustrating the detailed structure of the thermistor element (when not mounted) in FIG. 1.

The thermistor device 1 includes, as shown in FIGS. 1 and 2, a first base material sheet 11, a first lead electrode 12, a second lead electrode 13, a flexible thermistor element 14, and a second base material sheet 15.

The first base material sheet 11 preferably has a thickness of approximately 30 µm or less in the z-axis direction, and preferably includes a rectangular or substantially rectangular principal surface parallel to the xy plane, for example. In addition, the first base material sheet 11 preferably is made of a material including one of an epoxy-based resin and a polyimide-based resin, for example. Besides these resins, the sheet may be made of a material including one of a layered silicate such as talc and clay, for example.

The first lead electrode 12 and the second lead electrode 13 are preferably made of a metal containing Cu, for example. More specifically, the metal preferably is a Cu 5 to 15 Ni alloy, for example. Besides these metals, the first lead electrode 12 and the second lead electrode 13 may be made of a conductive adhesive, for example.

The first and second lead electrodes 12, 13 extend in the longitudinal direction (X-axis direction) of the first base material sheet 11, and are provided on a principal surface of the first base material sheet 11, so as to be parallel or substantially parallel to each other. In addition, ends (hereinafter, referred to as one end) of the lead electrodes 12, 13 in a negative direction of the x axis include terminal electrodes Ta, Tb to mount the thermistor device 1 on an external circuit substrate 16. The ends (hereinafter, referred to as the other end) of the lead electrodes 12, 13 in a positive direction of the x axis include terminal electrodes Tc, Td to mount the thermistor element 14 as described below.

The thermistor element 14 is provided with one of a positive temperature coefficient (PTC (Positive Temperature Coefficient)) and a negative temperature coefficient (NTC (Negative Temperature Coefficient). This thermistor element 14 generally includes, in order to develop flexibility, a metal base material 21, a thermistor thin film layer 22, and a pair of two first and second external electrodes 23a, 23b.

The metal base material 21 is preferably made of a noble metal such as Ag, Pd, Pt, or Au, or a base metal such as Cu, Ni, Al, W, or Ti, for example. Besides, the metal base material 21 may preferably be made of an alloy containing the noble metal and the base metal, for example. This metal base material 21 preferably is configured as a sheet formed from a powder paste of the metal material, and preferably has a cuboid or substantially cuboid shape of approximately 10 μm to 80 μm in thickness in the z-axis direction, for example.

The thermistor thin film layer 22 is preferably made of a ceramic material. This ceramic material is preferably made of an oxide of at least two transition elements selected from transition elements such as Mn, Ni, Fe, Ti, Co, Al, and Zn. This thermistor thin film layer 22 preferably is configured as a sheet formed from slurry of the ceramic material, and preferably has a thickness of approximately 1 μm to 10 μm in the z-axis direction, for example.

This thermistor thin film layer 22 is provided on a surface in a negative direction of the z axis, of two surfaces of the metal base material 21, which are parallel or substantially parallel to the xy plane. The thermistor thin film layer 22 preferably covers the entire surface of the metal base material 21. In other words, an outer edge of the thermistor thin film layer 22 preferably conforms or substantially conforms to an outer edge of the metal base material 21 in a planar view from the z-axis direction.

The first and second external electrodes 23a, 23b are preferably made of the same material as the metal base material 21, which are obtained by forming a paste of the material into a predetermined shape. The thermistor thin film layer 22 is provided on surfaces of the first and second external electrodes 23a, 23b in the negative direction of the z axis. The first and second external electrodes 23a, 23b are segmented electrodes spaced at a predetermined interval in the y-axis direction, which have a thickness on the order of about 0.1 μm to about 10 μm, for example.

The metal base material 21, the thermistor thin film layer 22, and the first and second external electrodes 23a, 23b are preferably subjected to firing in an integrated fashion. However, the firing is not limited thereto, and it is preferably that at least the metal base material 21 and the thermistor thin film layer 22 to be subjected to firing in an integrated fashion.

The thickness of the metal base material 21, the thermistor thin film layer 22, and the first and second external electrodes 23a, 23b preferably are as mentioned above, and the thermistor element 14 is thus thin, preferably on the order of about 10 μm to about 100 μm in thickness, for example. Furthermore, although the thermistor thin film layer 22 is brittle by itself, it is possible to provide the thermistor element 14 with flexibility in the present preferred embodiment, because the thermistor thin film layer 22 is integrated on the flexible metal base material 21.

Further, see the international publication WO 2011/024724 for further details of the thermistor element 14.

The thermistor element 14 as described above is mounted on the first base material sheet 11. More specifically, the first external electrode 23a and the second external electrode 23b are mounted on the terminal electrode Tc of the first lead electrode 12 and the terminal electrode Td of the second lead electrode 13, respectively, with a predetermined mounting material interposed therebetween. The mounting material preferably is a Sn alloy, a Bi alloy, a Cu-5 to 15 Ni alloy, or an Ag-based conductive adhesive, for example.

The second base material sheet 15 preferably has a thickness of approximately 30 μm or less in the z-axis direction, and preferably has a rectangular or substantially rectangular shape parallel to the xy plane, for example. In addition, the second base material sheet 15 is preferably made of the same material as the first base material sheet 11. This second base material sheet 15 is subjected to pressure bonding to the first base material sheet 11, while covering the first lead electrode 12, the second lead electrode 13, and the thermistor element 14. It is to be noted that the second base material sheet 15 preferably is not configured to entirely cover the first lead electrode 12 and the second lead electrode 13, and not intended to cover the terminal electrodes Ta, Tb and the vicinity thereof, in order to allow the circuit substrate 16 to be connected.

Next, a non-limiting example of a method for manufacturing the thermistor device 1 configured as described above will be described as a first example.

(1) First, Mn—Ni—Fe—Ti oxides are weighed as raw materials for the thermistor thin film layer 22, so as to provide a predetermined composition (resistivity of about $10^4$ Ωcm, for example). The weighed raw materials are sufficiently subjected to wet grinding with a ball mill through the use of a grinding medium such as zirconia. Thereafter, the ground raw materials are subjected to calcination at a predetermined temperature to provide a ceramic powder.

(2) Next, an organic binder is added to the ceramic powder obtained in the step (1), and mixed therewith in a wet way. Thus, slurry mixed with ceramic particles is obtained. From this slurry, a ceramic green sheet is produced by a doctor blade method or the like. In this regard, the thickness or the like of the ceramic green sheet is adjusted so that the thickness after firing is preferably about 5 μm (possibly about 10 μm). Onto the thus obtained ceramic green sheet, a metal paste for the metal base material 21, which contains Ag—Pd as its main constituent, is applied by a doctor blade method or the like, thus forming a mother sheet. In this regard, the thickness of the metal paste applied is adjusted so that the thickness of the fired mother sheet is preferably about 35 μm (possibly about 40 μm). Thereafter, onto the metal paste of the mother sheet, a metal paste containing Ag—Pd as its main constituent is applied by screen printing for the first and second external electrodes 23a, 23b.

(3) Next, the mother sheet obtained in the step (2) is cut into the size of the thermistor element 14. The cut body is housed in a sagger of zirconia. Thereafter, these mother sheets are subjected to binder removal treatment, and further subjected to firing at a predetermined temperature (for example, 1100° C.). Thus, the flexible thin thermistor element 14 composed of the metal base material 21, the thermistor thin film layer 22 and the first and second external electrodes 23a, 23b is obtained in large numbers.

Figure 4A:
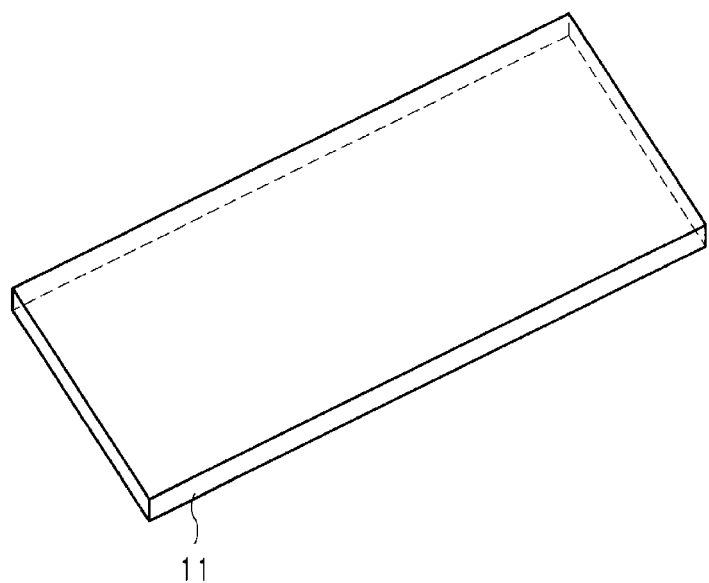
FIG. 4A is a schematic view illustrating a step (first) for manufacturing the thermistor device in FIG. 1.
Figure 4B:
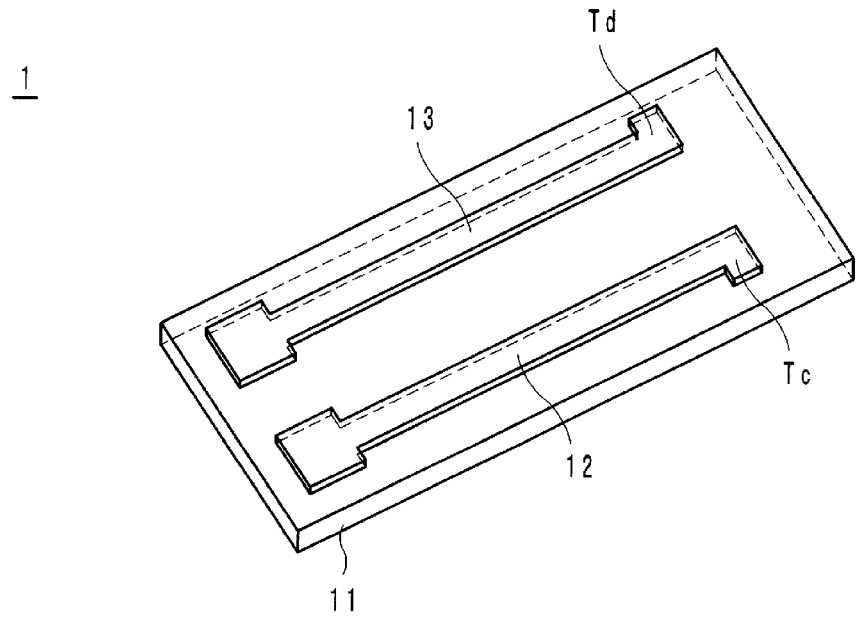
FIG. 4B is a schematic view illustrating a step following FIG. 4A.

(4) Next, as shown in FIG. 4A, the first base material sheet 11 made of resin is prepared which has a predetermined thickness (preferably about 25 μm, possibly about 30 μm, for example). Thereafter, as shown in FIG. 4B, electrode patterns for the first and second lead electrodes 12, 13 are formed on the first base material sheet 11 to have a predetermined thickness (preferably about 5 μm, possibly 18 μm, for example). As for the specific approach for the electrode formation, it is preferable to print a conductive adhesive from the perspective of simplification of the manufacturing step. However, the approach is not limited thereto, and the electrode patterns may be formed by metal foil bonding and metal plating.

Figure 4C:
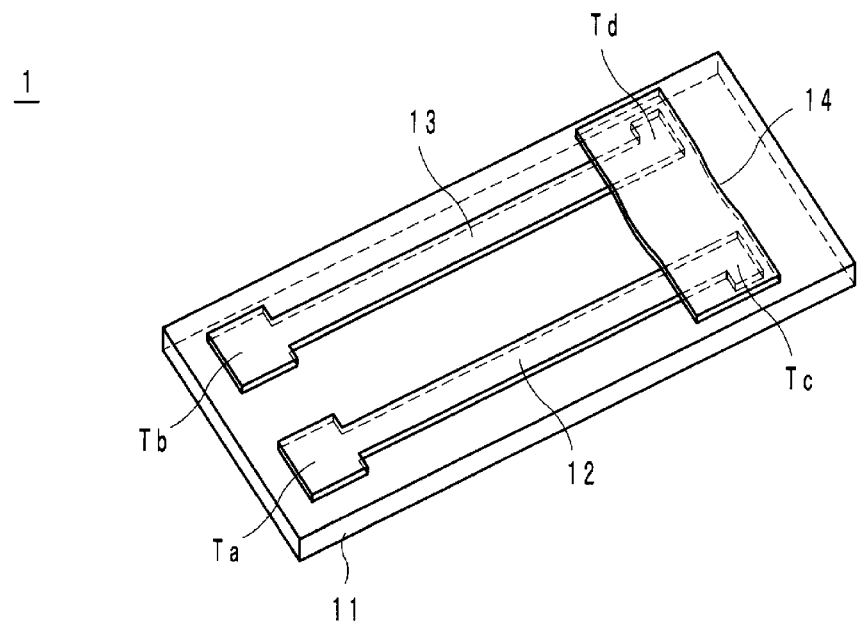
FIG. 4C is a schematic view illustrating a step following FIG. 4B.

(5) Next, the mounting material is applied or printed onto the terminal electrodes Tc, Td obtained in the step (4). Thereafter, as shown in FIG. 4C, the first and second external electrodes 23a, 23b are bonded to the terminal electrodes Tc, Td with a mounting device such as a mounter, thus mounting the thermistor element 14 obtained in the steps (1) to (3) on the first base material sheet 11.

Figure 4D:
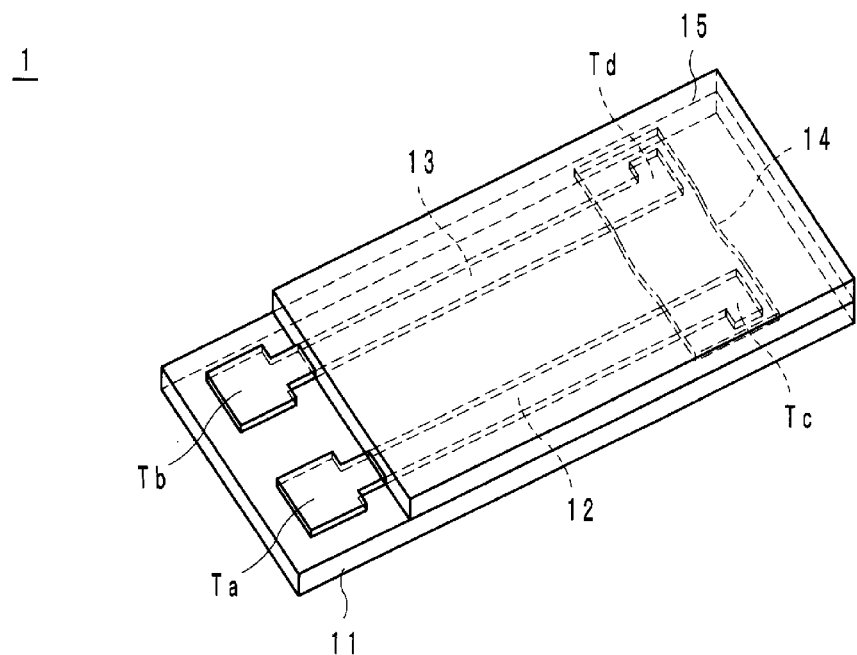
FIG. 4D is a schematic view illustrating a step following FIG. 4C.
Figure 5A:
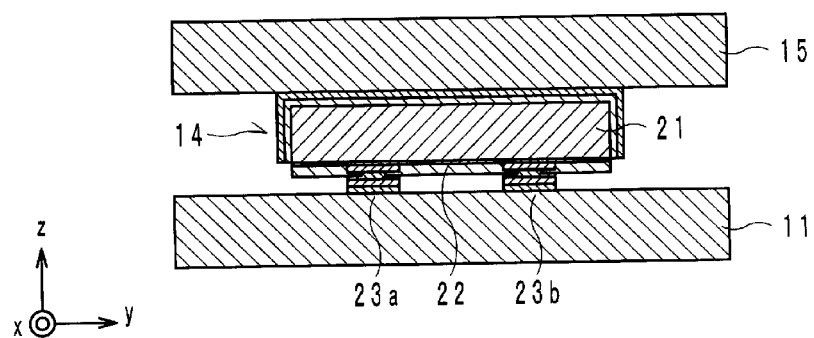
FIG. 5A is a schematic view illustrating a main portion of the thermistor device (when not mounted) in FIG. 1.
Figure 5B:
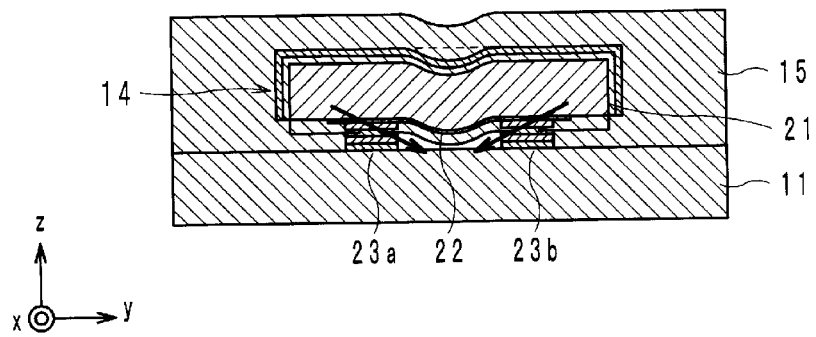
FIG. 5B is a schematic view illustrating a main portion of the thermistor device (subjected to pressure bonding) in FIG. 1.

(6) Next, the second base material sheet 15 made of resin is prepared which has a predetermined thickness (preferably about 10 μm, possibly about 30 μm, for example). Thereafter, as shown in FIGS. 4D and 5A, the second base material sheet 15 is subjected to pressure bonding to the first base material sheet 11, so as to sandwich the thermistor element 14 and the first and second lead electrodes 12, 13 in collaboration with the first base material sheet 11. In this regard, the terminal electrodes Ta, Tb are exposed as described above. In addition, as shown in FIG. 5A, the thermistor element 14 has flexibility, and the first external electrode 23a, mounting material, and terminal electrode Tc, as well as the second external electrode 23b, mounting material, and terminal electrode Td have heights in the z-axis direction with respect to the principal surface of the first substrate material sheet 11. Therefore, the pressure bonding applies, as shown in FIG. 5B, stress in the directions of arrows to the bonded part between the thermistor element 14 and the first base material sheet 11. As a result, after the pressure bonding, at least in the metal base material 21 and the thermistor thin film layer 22, a deflection (in other words, warpage) in the negative direction of the z axis, that is, in the direction toward the principal surface of the first base material sheet 11 is generated between the first external electrode 23a and the second external electrode 23b. In this regard, the warpage preferably brings the thermistor thin film layer 22 into contact with the principal surface of the first base material sheet 11. It is to be noted that the amount of warpage is related to the distance (that is, interval) in the z-axis direction between the lower surface of the thermistor thin film layer 22 and the principal surface of the first base material sheet 11.

In accordance with the steps (1) to (6) mentioned above, the thermistor device 1 is obtained which has a largest portion on the order of about 100 μm or about 200 μm in thickness.

The thermistor device 1 configured as described above preferably is used, for example, for temperature detection of a lithium ion battery (hereinafter, referred to as a LIB) built in a smartphone. In recent years, the amounts of heat generation have been increased by performance improvement of electronic devices such as smartphones. Cooling by a cooling fan or the like or heat release to a heat sink or the like may fail to reduce heat generation in some cases, and thus, in the electronic devices, the temperatures of heat-generating components (typically, LIB) are detected, and based on the results, the operation of the components is controlled so as to reduce heat generation from the components. However, in recent electronic devices, it is difficult to ensure the installation space for temperature sensors and peripheral circuits therefor, because various types of components are also often mounted densely around LIBs. In such a case, a temperature sensor provided with the thin thermistor device 1 is particularly useful.

Figure 5C:
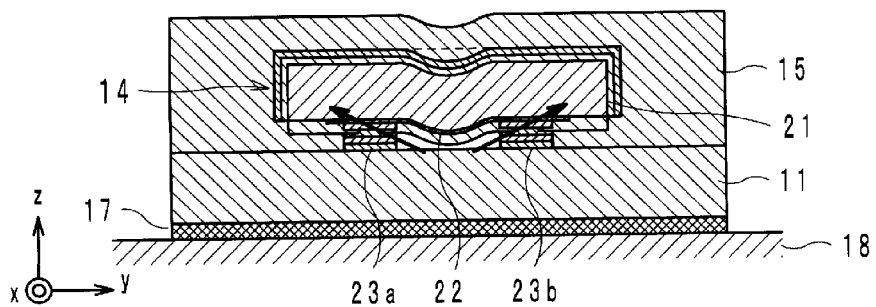
FIG. 5C is a schematic view illustrating a main portion of the thermistor device (in temperature detection) in FIG. 1.
Figure 6:
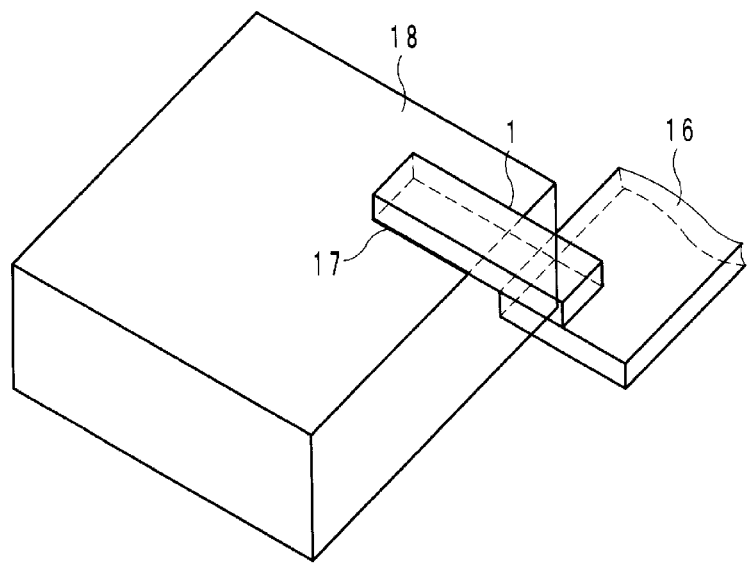
FIG. 6 is a schematic view illustrating an additional technical advantage of the thermistor device in FIG. 1.

In FIG. 6, a temperature sensor includes the thermistor device 1, the circuit substrate 16, and an adhesive 17. The thermistor device 1 is attached to an object 18 to be measured. More specifically, as shown in FIG. 5C, the opposed surface of the first base material sheet 11 is provided with the adhesive 17 such as, for example, an adhesive sheet. In this regard, the opposed surface refers to the surface of the first base material sheet 11, which is mutually opposed to the principal surface of the first base material sheet 11 in the negative direction of the z axis. In addition, the adhesive 17 is provided on the opposed surface at the beginning of the previously described manufacturing step (4), or at the end of the manufacturing step (6). This adhesive 17 is used to fix the thermistor device 1 to the surface of the object 18 to be measured, such as a LIB.

The external circuit 16 is connected to the terminal electrodes Ta, Tb of the thermistor device 1, to pass, for example, a constant current through a conduction pathway from the terminal electrode Ta via the metal base material 21 to the terminal electrode Tb. In this case, the ambient temperature changes the resistance value between the terminal electrode Ta and the metal base material 21 and the resistance value between the terminal electrode Tb and the metal base material 21. As a result, a voltage on the basis of the ambient temperature is developed between the terminal electrodes Ta, Tb. The external circuit 16 outputs the voltage value as a temperature of the object 18 to be measured.

In this regard, the increased temperature of the object 18 to be measured expands at least the first base material sheet 11 and thermistor element 14 in the thermistor device 1. In this case, in terms of rate of thermal expansion, the first base material sheet 11 of resin is higher than the thermistor element 14. Therefore, as shown in FIG. 5C, stress is applied in the directions opposite to those in the case of FIG. 5B to the bonded part between the thermistor element 14 and the first base material sheet 11. However, the thermistor device 1 causes the metal base material 21 and thermistor thin film layer 22 to undergo a deflection between the first external electrode 23a and the second external electrode 23b after the pressure bonding, as shown in FIG. 5B, thus making it possible to absorb stress due to the change in temperature in the temperature detection. As just described, the thermistor device 1 improves tolerance to stress due to the change in temperature in practical use.

Furthermore, as described above, after the pressure bonding, the metal base material 21 and the thermistor thin film layer 22 preferably undergo a deflection between the first external electrode 23a and the second external electrode 23b, and have contact with the principal surface of the first base material sheet 11. Thus, the thermistor device 1 will not detect the temperature of the object 18 to be measured, through a layer of highly adiabatic air, but directly detects the temperature of the object 18 to be measured. This allows the thermistor device 1 to detect the temperature of the object 18 to be measured at high speed and with a high degree of accuracy.

Figure 7:
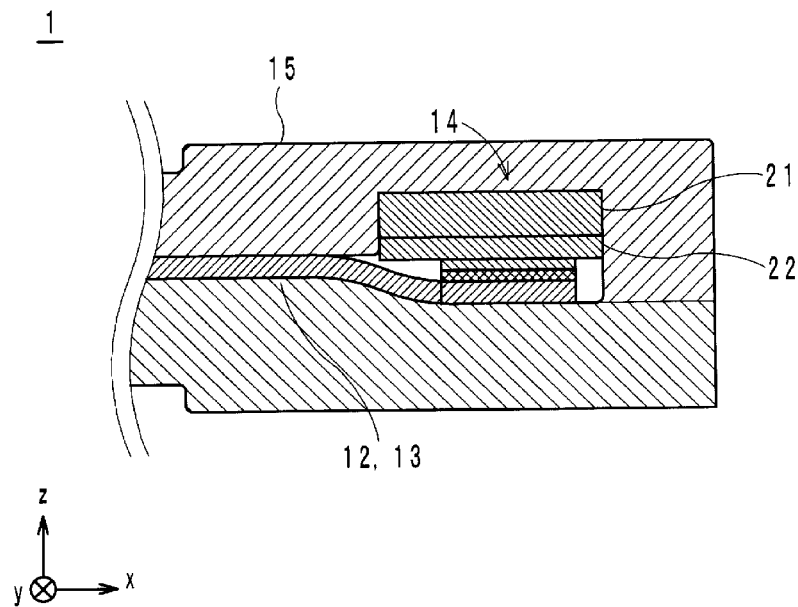
FIG. 7 is a schematic view illustrating a temperature sensor including the thermistor device in FIG. 1.

Furthermore, as described above, in the thermistor device 1, the thermistor thin film layer 22 covers the entire surface of the metal base material 21. This configuration allows the metal base material 21 to be prevented from causing short circuit in the first and second lead electrodes 12, 13, as shown in FIG. 7.

Further, as described above, the first base material sheet 11 and the second base material sheet 15 preferably are made of the same material in the thermistor device 1. Thus, the first base material sheet 11 and the second base material sheet 15 are favorably subjected to thermocompression bonding.

It is to be noted that the configuration of the thermistor element 14 sealed with the first base material sheet 11 and the second base material sheet 15 has been illustrated from the perspective of tolerance to gas and the like in the present preferred embodiment. However, the configuration is not limited thereto, and there is no need for the thermistor device 1 to include the second base material sheet 15 from the perspective of thickness.

Figure 8:
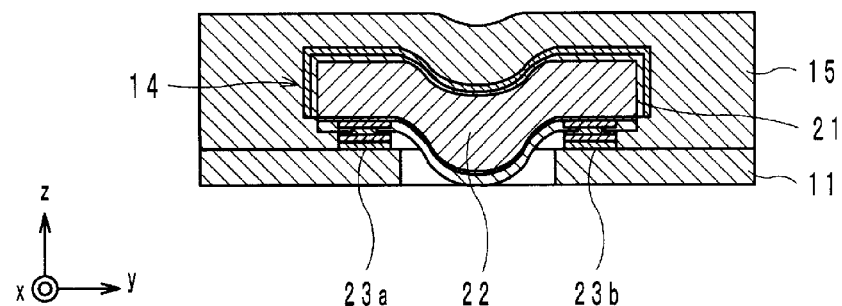
FIG. 8 is a vertical cross-sectional view illustrating the structure of a thermistor device according to a modification example of a preferred embodiment of the present invention.

In addition, besides, from the perspective of temperature sensor responsiveness, as shown in FIG. 8, the thermistor thin film layer 22 may be exposed to the outside between the first lead electrode 12 and the second lead electrode 13 in a planar view from the negative direction of the z axis, e.g., through the formation of a through hole in the first base material sheet 11. In this case, the position of the thermistor thin film layer 22 in the z-axis direction is preferably aligned with the opposed surface of the first base material sheet 11 (that is, the surface opposed to the principal surface in the z-axis direction).

The thermistor device according to various preferred embodiments of the present invention is able to further improve the stress tolerance, and preferred for a temperature sensor, a heater, etc.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A thermistor device comprising:
   a first base material member including a principal surface;
   a thermistor element including a thermistor thin film provided on a metal base material and a first external electrode and a second external electrode provided on the thermistor thin film; and
   a first lead electrode and a second lead electrode provided on the principal surface of the first base material member, and connected to the first external electrode and the second external electrode; wherein
   each of the thermistor thin film and the metal base material is configured to undergo a deflection between the first external electrode and the second external electrode.

2. The thermistor device according to claim 1, wherein each of the thermistor thin film and the metal base material is configured to undergo a deflection toward the first base material member between the first lead electrode and the second lead electrode.

3. The thermistor device according to claim 1, wherein the thermistor thin film contacts the first base material member between the first lead electrode and the second lead electrode.

4. The thermistor device according to claim 1, wherein the thermistor thin film is exposed in a planar view from a normal direction of the principal surface between the first lead electrode and the second lead electrode.

5. The thermistor device according to claim 1, wherein the device includes a second base material member covering the thermistor element, the first lead electrode, and the second lead electrode, the member being pressure bonded to the principal surface of the first base material member.

6. The thermistor device according to claim 5, wherein the first base material member and the second base material member include a same resin material.

7. The thermistor device according to claim 5, wherein the second base material member is made of resin.

8. The thermistor device according to claim 1, wherein the thermistor device defines a temperature sensor configured to detect a temperature of an object, and a surface of the first base material member, opposed to the principal surface, is capable of contacting the object.

9. The thermistor device according to claim 8, further comprising an adhesive on the surface of the first base material member, opposed to the principal surface.

10. The thermistor device according to claim 1, wherein the first base material member is made of resin.

11. The thermistor device according to claim 1, wherein the first base material member is made of a layered silicate.

12. The thermistor device according to claim 1, wherein the thermistor element is provided with one of a positive temperature coefficient and a negative temperature coefficient.

13. The thermistor device according to claim 1, wherein the thermistor thin film is made of ceramic.

14. The thermistor device according to claim 1, wherein the thermistor thin film covers an entire or substantially an entire surface of the metal base material.

15. The thermistor device according to claim 1, wherein the first and second external electrodes are made of a same material as the metal base material.

16. The thermistor device according to claim 1, wherein the metal base material and the thermistor thin film are co-fired and integrated together.

17. The thermistor device according to claim 1, wherein the metal base material, the thermistor thin film, and the first and second external electrodes are co-fired and integrated together.

18. The thermistor device according to claim 1, wherein the second base material sheet does not entirely cover the first lead electrode and the second lead electrode.

19. An apparatus comprising:
   a heating generating device;
   an adhesive; and
   the thermistor device according to claim 1 mounted to the heat generating device via the adhesive.

20. The apparatus according to claim 19, wherein the heat generating device is a lithium ion battery.

* * * * *